United States Patent [19]

Brytus et al.

[11] Patent Number: 4,845,172
[45] Date of Patent: * Jul. 4, 1989

[54] CO-ADVANCED RESINS FROM COPOLYMERS OF POLYETHERS OF POLYHYDRIC PHENOLS AND DIGLYCIDYL ETHERS OF DI-SECONDARY ALCOHOLS

[75] Inventors: Vincent Brytus, Mahopac, N.Y.; Kenneth L. Payne, Lansing, Mich.

[73] Assignee: Ciba-Geigy Corporation, Ardsley, N.Y.

[*] Notice: The portion of the term of this patent subsequent to Apr. 12, 2005 has been disclaimed.

[21] Appl. No.: 186,753

[22] Filed: Apr. 26, 1988

Related U.S. Application Data

[63] Continuation of Ser. No. 87,563, Aug. 19, 1987, Pat. No. 4,737,553.

[51] Int. Cl.$^4$ .................. C80G 59/02; C80G 59/62
[52] U.S. Cl. ...................................... 525/481; 525/509; 525/510; 528/101; 528/103; 528/97; 528/98; 528/99; 528/104
[58] Field of Search ............... 528/97, 98, 99, 101, 528/103, 104; 525/509, 510, 481

[56] References Cited

U.S. PATENT DOCUMENTS

| | | | |
|---|---|---|---|
| 4,122,067 | 10/1978 | Anderson | 528/87 |
| 4,284,574 | 8/1981 | Bagga | 549/555 |
| 4,737,553 | 4/1988 | Gannon et al. | 525/481 |

Primary Examiner—John Kight
Assistant Examiner—Frederick Krass
Attorney, Agent, or Firm—Harry Falber

[57] ABSTRACT

Co-advanced epoxy resins prepared by the reaction of polyethers of polyhydric phenols, diglycidyl ethers of di-secondary alcohols and dihydric phenols, said co-advanced resins being heat curable with suitable curing agents to afford cured coating compositions exhibiting a variety of excellent physical properties and performance characteristics.

The diglycidyl ethers have the following formula:

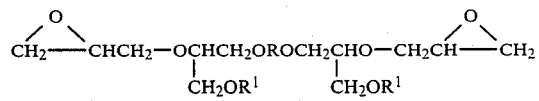

as defined in the specification.

14 Claims, No Drawings

CO-ADVANCED RESINS FROM COPOLYMERS OF POLYETHERS OF POLYHYDRIC PHENOLS AND DIGLYCIDYL ETHERS OF DI-SECONDARY ALCOHOLS

This is a continuation of application Ser. No. 087,563, filed 8/19/87, now U.S. Pat. No. 4,737,553.

The so-called "advancement" of relatively low molecular weight and low-melting or liquid epoxide resins by reaction with poly-functional compounds of which the functional groups react with epoxide groups, to give relatively higher molecular weight, higher melting epoxide resins is known. Such a so-called "advancement" is above all intended to improve or modify, in the desired direction, the technical processing properties for certain end uses. For some end uses, for example in sintering powders, compression moulding powders and the like, an increase in the softening point or melting point can be desirable. Advanced epoxy resins are, for example, disclosed in U.S. application Ser. No. 912,722, filed Sept. 29, 1986 and relate to the reaction of diglycidyl ethers of di-secondary alcohols and dihydric phenols.

The subject of the present invention is a modification of the latter advanced epoxy resin product which involves co-advancement by reacting a polyglycidyl ether of a polyhydric phenol and a diglycidyl ether of a di-secondary alcohol with a dihydric phenol. Subsequent to curing, these co-advanced resins are functional as high solids coating compositions and adhesives. These systems enhance the performance characteristics of the cured products relative to standard epoxy resin systems in terms of adhesion, flexibility, chemical resistance, salt fog corrosion resistance and mechanical properties including hardness, impact strength and mechanical strength. They also exhibit harder films and improved corrosion resistance relative to the advanced systems specifically described above.

The applicable diglycidyl ethers of di-secondary alcohols, processes for the preparation thereof and curable compositions thereof as blends with epoxy resins are disclosed in U.S. Pat. No. 4,284,574. These ethers correspond to the formula

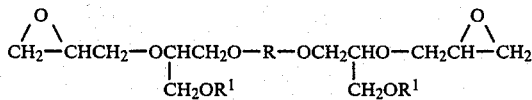

wherein R is phenylene, naphthylene or a radical consisting of two or three phenylene groups linked by one or two carbon-carbon bonds, ether oxygen atoms, sulphur atoms, sulphonyl groups, sulphoxide groups, carbonyl groups, or alkylene groups of 1 to 5 carbon atoms, each phenylene group or each naphthylene group optionally being substituted in the ring or rings by one or two alkyl groups, each of from 1 to 4 carbon atoms, or by one or two chlorine or bromine atoms; and $R^1$ independently are a straight chain or branched alkyl group of 1 to 16 carbon atoms, which may be substituted by one or four chlorine or bromine atoms; a straight chain or branched alkenyl group of 2 to 6 carbon atoms, which may be substituted by one to four chlorine or bromine atoms; a phenyl or naphthyl group, optionally substituted in the ring or rings by one or two chlorine or bromine atoms or by one or two alkyl groups, each of 1 to 4 carbon atoms, and having in all from 6 to 12 carbon atoms; a phenylalkyl or naphthylalkyl group, optionally substituted in the ring or rings by one or two chlorine or bromine atoms or by one or two alkyl groups, each of 1 to 4 carbon atoms, said phenylalkyl or naphthylalkyl group having in all from 7 to 12 carbon atoms; a cycloalkyl group of 3 to 6 carbon atoms; or a cycloalkylalkyl group of from 4 to 10 carbon atoms.

Preferably, the groups $R^1$ are the same and each represents an alkyl group of 1 to 14 carbon atoms, an allyl group, a cyclohexyl group, or a benzyl group. Further preferred compounds are those wherein R represents a radical consisting of two phenylene rings linked in the o-o', o-p', or p-p' position by an alkylene group of 1 to 4 carbon atoms. Compounds where R represents a group of formula

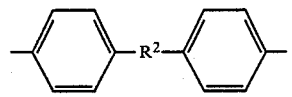

where $R^2$ represents a methylene or isopropylene group, and those where each $R^1$ represents an alkyl group of from 1 to 12 carbon atoms, more particularly of from 1 to 6 carbon atoms, are especially preferred.

Specific examples of such diglycidyl ethers are:
2,2-bis(p-(3-butoxy-2-glycidyloxypropyloxy)phenyl)-propane;
2,2-bis(p-(3-methoxy-2-glycidyloxypropyloxy)phenyl)-propane;
2,2-bis(p-(3-ethoxy-2-glycidyloxypropyloxy)phenyl)-propane;
2,2-bis(p-(3-dodecyloxy-2-glycidyloxypropyloxy)-phenyl)-propane;
2,2-bis(p-(3-tetradecyloxy-2-glycidyloxypropyloxy)-phenyl)-propane;
2,2-bis(p-(3-benzyloxy-2-glycidyloxypropyloxy)-phenyl)-propane;
bis(p-(3-butoxy-2-glycidyloxypropyloxy)phenyl)methane;
1,3-bis(3-phenoxy-2-glycidyloxypropyloxy)benzene;
bis(p-(3-butoxy-2-glycidyloxypropyloxy)phenyl)sulphone;
2,2-bis(p-(3-cyclohexyloxy-2-glycidyloxypropyloxy)-phenyl)-propane;
2,2-bis(4-(3-butoxy-2-glycidyloxypropyloxy)3,5-dibromophenyl)propane;
2,2-bis(p-(3-allyloxy-2-glycidyloxypropyloxy)phenyl)-propane;
2,2-bis(p-(3-benzyloxy-2-glycidyloxypropyloxy)-phenyl)-propane;
1,3-bis(2-glycidyloxy-3-phenoxypropyloxy)benzene; and
2,2-bis(p-(3-phenoxy-2-glycidyloxypropyloxy)phenyl)-propane.

Suitable polyethers of polyhydric phenols excluding the diglycidyl ethers noted above, include for example, the polyglycidyl polyethers of dihydric phenols including mononuclear phenols such as resorcinol, catachol, hydroquinone and methyl resorcinol and polynuclear phenols such as 4,4'-dihydroxy benzophenone, 1,5-dihydroxy naphthalene and particularly the alkylene bisphenols such as 2,2-bis(4-hydroxyphenyl)propane, 1,1-bis(4-hydroxyphenyl)propane, 1,1-bis(4-hydroxyphenyl)ethane, 1,1-bis(4-hydroxyphenyl)isobutane, 2,2-bis(4-hydroxyphenyl)butane, 2,2-bis(4-hydroxy-2- methylphenyl)propane, 1,1-bis(4-hydroxyphenyl)-2-methyl propane, 3,3-bis(4-hydroxyphenyl)pentane, 1,1-bis(4-hydroxyphenyl)2-ethylhexane, and bis(4-hydroxyphenyl)methane.

The glycidyl ethers of the polyhydric phenols may be prepared according to well known methods. For example, the glycidyl ethers of the dihydric phenols may be prepared by reacting the dihydric phenol with epichlorohydrin at 50° C. to 150° C. using a molar excess of the epichlorohydrin in the presence of a base such as KOH, NaOH, Ca(OH)$_2$, the base being usually employed in slight stoichiometric excess of the epichlorohydrin. The usually complex mixture of products from such reaction may be generally represented by the formula:

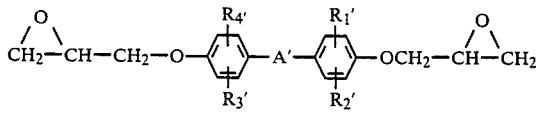

where T represents a divalent hydrocarbon radical of the dihydric phenol and where n is an integer of the series 0, 1, 2, 3, etc. The average length of the chain enclosed in the parenthesis can be varied by changing the molar ratio of epichlorohydrin to dihydric phenol. Generally as the molar ratio of epichlorohydrin to dihydric phenol is decreased from 2:1 towards 1:1 the average value of n increases, increasing the softening temperature of the resulting product.

Preferably, the epoxy ethers employed in the compositions of the invention contain only carbon, oxygen, hydrogen and halogen atoms. However, other epoxy ethers may also be employed if desired as the glycidyl ethers of polyhydric thio ethers such as 2,2'-dihydroxy diethyl sulfide, or the glycidyl ethers of thio alcohols such as alpha-monothioglycerol.

Particularly preferred in the practice of the present invention are the polyglycidyl polyethers of alkylene bis-phenols such as the commonly employed 2,2-bis(4-hydroxyphenyl)propane, having molecular weights ranging from about 350 to 900 and epoxide equivalent weights ranging from 190 to 450. Thus, the preferred ethers correspond to the formula

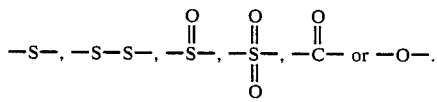

wherein R$_1$', R$_2$', R$_3$' and R$_4$' are independently hydrogen, bromine or chlorine, and A' is C$_1$-C$_4$ alkylene or alkylidene or

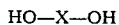

The applicable dihydric phenols correspond to the formula

HO—X—OH wherein X is 1,2-phenylene, 1,3-phenylene, 1,4-phenylene or

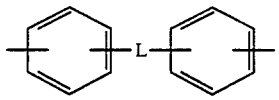

wherein L is a direct bond, alkylene of 1 to 6 carbon atoms, alkylidene of 2 to 6 carbon atoms, or

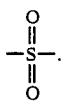

These represent, for example, bisphenols F, A and S, catechol, resorcinol, o,o'-biphenol and p,p'-biphenol. The various phenols may be substituted on the respective phenyl rings by such non-reactive substituents as halogen, alkyl and the like. Bisphenol A is preferred.

The glycidyl ethers will generally be present in weight ratios of polyglycidyl ether of polyhydric phenol to diglycidyl ether of di-secondary alcohol of 10:90 to 90:10 and preferably 50:50, and in total concentrations ranging from 65 to 92%, by weight of the co-advanced adduct, and preferably 70 to 85%. Correspondingly, the dihydric phenol is present in concentrations ranging from 35 to 8%, by weight of the co-advanced adduct, and preferably 30 to 15%. The respective concentrations are selected in order to insure the appropriate molecular weight for the co-advanced product.

The co-advancement reaction procedure generally involves the reaction of the respective diglycidyl ethers and the dihydric phenol in the presence of an advancing catalyst or accelerator. Typical catalysts include alkali metal hydroxides, imidazoles, phosphonium compounds, and the like. The specific choice of catalyst will depend on the intended end use application. In order to facilitate the initial blending operation, it may be desirable to warm the diglycidyl ether to about 90° to 120° C. and then to add dihydric phenol. Stirring at this point provides a clear melt blend. The catalyst is then added and the temperature is raised to 130° to 180° C. to effect the advancement reaction. The progress of the reaction can be monitored by titration of the epoxide groups using samples taken during the reaction. Completion of the reaction will generally take 2 to 15 hours to provide resin systems having epoxy values in the range of 0.01–0.2 epoxy equivalents per 100 grams of resin. The resulting advanced resins are viscous liquids or tack-free solids.

Depending upon the desired end use application, the resin will be formulated with the appropriate ingredients and combined with the appropriate hardener and accelerator components. For the primary area of utility of the instant resin systems as coating compounds, melamine-formaldehyde curing agents are preferred. Other applicable curing agents include di- or polyfunctional isocyanates, urea-formaldehyde resins, phenol-formaldehyde resins and additional conventional curing agents.

An effective amount of the curing agent is employed. The proportion will depend on the chemical nature of the curing agent and the properties sought of the curable composition and its cured product; the optimum proportion readily being determined by methods familiar to those skilled in the art. By way of illustration, the hardener may be used in concentrations ranging from 5 to 20%, by weight of the total co-advanced resin.

The resin-hardener systems can furthermore be mixed, prior to cure, with usual modifiers such as extenders, fillers and reinforcing agents, pigments, dyestuffs, plasticizers, diluents, accelerators, and the like. As extenders, reinforcing agents, fillers and pigments which can be employed in the curable systems according to the invention there may be mentioned, for example: coal tar, bitumen, glass fibers, boron fibers, carbon fibers, cellulose, polyethylene powder, polypropylene powder, mica, asbestos, various quartz powders, fused silicas, silicates, silanes, magnesium and calcium carbonates, gypsum, bentones, silica aerogel ("Aerosil"), lithopone, barite, titanium dioxide, carbon black, graphite, or iron powder. It is also possible to add other usual additives, for example flameproofing agents such as antimony trioxide, agents for conferring thixotropy, flow control agents such as silicones, cellulose acetate butyrate, polyvinyl butyral waxes, stearates and the like (which are in part also used as mold release agents) to the curable systems. The accelerators that are added may be identical to the advancement catalysts or may additionally include boron trifluoride monoethylamine complexes, tertiary amines, and the like.

The end products can be manufactured in the usual manner with the aid of known mixing equipment (kneaders, extruders, rollers, and the like).

Curing will generally be conducted at temperatures ranging from 175° to 225° C. The expression "cure", as used herein, denotes the conversion of the above systems into insoluble and infusible crosslinked products, with simultaneous shaping to give shaped articles such as moldings, pressings or laminates, or to give two-dimensional structures such as coatings, enamels or adhesive bonds.

The curable epoxide resin mixtures are especially useful in the fields of surface protection, the electrical industry, laminating processes and the building industry. They can be used in a formulation which is in each case suited to the particular end use, in the unfilled or filled state, optionally in the form of solutions or emulsions, as paints, enamels, sintering powders, compression molding compositions, dipping resins, casting resins, injection molding formulations, impregnating resins and adhesives, as tooling resins, laminating resins, sealing and filling compositions, floor covering compositions and binders for mineral aggregates.

Of primary interest is their utility as protective coatings. The coating composition may be applied to any suitable substrate by any suitable means such as spraying, dipping, brushing, painting or roller coating. After the desired film thickness is applied, curing proceeds at elevated temperatures. The resultant cured coatings are void-free and possess excellent physical properties and chemical resistance. The distinct advantage of these systems is exhibited in the former area where excellent mechanical properties are noted. Of particular value is the unexpected low viscosity compared to standard bisphenol A/epichlorohydrin resins. This low viscosity allows for the formulation of higher solids coatings thus reducing the level of solvent emissions and facilitating compliance with regulations of the Environmental Protection Agency. Correspondingly, coatings based on these resins also result in an unexpectedly high salt fog corrosion resistance and are characterized by having better adhesion and flexibility than standard bisphenol A resins.

The following examples will further illustrate the embodiments of the instant invention. In these examples, all parts are given by weight unless otherwise noted.

EXAMPLE 1

This example illustrates the preparation of typical co-advanced resins of this invention.

The diglycidyl ethers, bisphenol and catalyst are charged to a two liter, 4-neck break-away reaction kettle equipped with a mechanical stirrer, condenser, and thermometer/Thermowatch ® temperature regulator. The system is flushed for thirty minutes with $N_2$ followed by gradual heating via a heating mantle to the desired reaction temperature. A schedule of 2 hours at 130° C. followed by heating at 165°-180° C. until the resins are in the theoretical epoxy specification is employed.

Samples are removed from the reaction kettle periodically using a deflagration spoon, dissolved in 50 ml of 1:1 mixture of benzyl alcohol/isopropanol, and brought to a mild reflux. 5.0 ml of a freshly prepared solution of potassium iodide (3 g/5 ml $H_2O$) are added to this medium along with 10 drops of a 0.04% solution of bromophenol blue. This resulting mixture is then titrated under reflux to a faint yellow end-point with 1.0N hydrochloric acid. Heating is discontinued and the resulting molten epoxy resin is poured into a lined tray and allowed to solidify once the epoxy value is within specification.

The following co-advanced resins are prepared:

|  | Resin (parts) | | | |
| --- | --- | --- | --- | --- |
|  | A | B | C | D |
| 2,2-bis(p-3(butoxy-2-glycidyl-oxypropyloxy)phenyl)propane | 500 | 500 | 500 | 500 |
| diglycidyl ether of bisphenol A | 500 | 500 | 500 | 500 |
| bisphenol A | 304.7 | 388.9 | 418.0 | 433.9 |
| formylmethyltriphenylphosphoniumchloride(catalyst) | 0.1 | 0.1 | 0.1 | 0.1 |
| final epoxy value (eq./100 g) | 0.104 | 0.046 | 0.029 | 0.014 |
| final epoxide equivalent weight (g) | 962 | 2174 | 3448 | 7143 |
| Gardner-Holdt bubble viscosity @ 25° C. (40% non-volatiles in butyl carbitol) | M | W | Y | $Z_2$-$Z_3$ |
| Gardner color | 1 | 2 | 3 | 4 |
| resin type* | 4 | 7 | 9 | 488 |

*Informal notation directed to advanced resins reflecting an approximate measure of the number of repeating units in the resin chain.

EXAMPLE II

The adducts are formulated into curable coating systems as follows: Adduct (50% weight solids in methyl ethyl ketone) blended with crosslinking resin and catalyst. Control coatings are based on the use of the diglycidylated ether of bisphenol A in place of the two glycidylated ether components.

The formulated materials are drawn into 8 mil wet films on aluminum and tin plate panels, allowed a five minute induction period, air dried for 60 minutes at 25° C. and then cured at the indicated cure schedule.

Crosslinking Resins

1. Cymel 303-alkylated melamine-formaldehyde resin from American Cyanamid
2. HZ 949U-phenol-formaldehyde condensate resin from CIBA-GEIGY Corporation.
3. Beckamine 21-511-butylated urea-formaldehyde resin from Monsanto Chemical Co.

Catalysts 1. p-toluene sulfonic acid
2. FC-520-trifluoromethane sulfonic acid salt from 3M Co.
3. Nacure 155-naphthalene sulfonic acid from King Industries
4. Phosphoric acid The various systems and test data are noted in the following tables:

|  | Coating System |  |  |  |  |  |  |  |  |  |  |  |
|---|---|---|---|---|---|---|---|---|---|---|---|---|
|  | G | H | I | J | K | L | M | N | O | P | Q | R |
| Epoxy Resin | A | A | A | B | B | B | C | C | C | D | D | D |
| Crosslinking Resin | 1 | 2 | 3 | 1 | 2 | 3 | 1 | 2 | 3 | 1 | 2 | 3 |
| Epoxy:Crosslinker Weight Ratio | 9:1 | 3:1 | 3:1 | 9:1 | 3:1 | 3:1 | 9:1 | 3:1 | 3:1 | 9:1 | 3:1 | 3:1 |
| Catalyst | 1 | 2 | 4 | 3 | 3 | 4 | 1 | 2 | 4 | 3 | 3 | 4 |
| Catalyst Conc. (% by weight) | 3 | 3 | 1 | 1 | 1 | 1 | 3 | 3 | 1 | 1 | 1 | 1 |
| Cure Time (minutes) | 20 | 20 | 20 | 20 | 20 | 20 | 20 | 20 | 20 | 20 | 20 | 20 |
| Cure Temp. (°C.) | 180 | 200 | 160 | 160 | 160 | 140 | 160 | 180 | 140 | 180 | 160 | 140 |

|  | Coating System (Aluminum Plate) | | | | | |
|---|---|---|---|---|---|---|
|  | G-control | G | H-control | H | I-control | I |
| Appearance | clear | clear | clear | clear | clear | clear |
| Persoz (sec.)[a] | 375 | 385 | 366 | 389 | 298 | 392 |
| Direct Impact (cm.kg.)[b] | >184 | >184 | >184 | >184 | >184 | >184 |
| Reverse Impact (cm.kg.)[c] | >184 | >184 | >184 | >184 | >184 | >184 |
| Pencil Hardness[d] | 5H | 5H | 5H | 6H | 8H | 5H |
| Adhesion (%)[e] | 100 | 100 | 100 | 100 | 100 | 100 |
| Mandrel Bend (cm.)[f] | 0.3 | 0.3 | 0.3 | 0.3 | 0.3 | 0.3 |

[a] ASTM D 4366
[b] ASTM G 14
[c] ASTM G 14
[d] ASTM D 3363
[e] ASTM D 3359
[f] ASTM G 10

|  | Coating System (Tin Plate) | | | | | |
|---|---|---|---|---|---|---|
|  | G-control | G | H-control | H | I-control | I |
| Appearance | clear | clear | clear | clear | clear | clear |
| Persoz (sec.) | 361 | 365 | 334 | 316 | 350 | 345 |
| Direct Impact (cm.kg.) | 66 | >184 | >184 | >184 | >184 | >184 |
| Reverse Impact (cm.kg.) | 33 | >184 | >184 | >184 | >184 | >184 |
| Pencil Hardness | 4H | 4H | 5H | 5H | 4H | 6H |
| Adhesion (%) | 10 | 75 | 95 | 100 | 100 | 100 |
| Mandrel Bend (cm.) | 0.3 | 0.3 | 0.3 | 0.3 | 0.3 | 0.3 |

|  | Coating System (Al) | | | | | |
|---|---|---|---|---|---|---|
|  | J-control | J | K-control | K | L-control | L |
| Appearance | clear | clear | clear | clear | clear | clear |
| Persoz (sec.) | 346 | 374 | 391 | 384 | 375 | 370 |
| Direct Impact (cm.kg.) | >184 | >184 | >184 | >184 | >184 | >184 |
| Reverse Impact (cm.kg.) | >184 | >184 | >184 | >184 | >184 | >184 |
| Pencil Hardness | 4H | 5H | 2H | 3H | 5H | 5H |
| Adhesion (%) | 100 | 100 | 100 | 100 | 100 | 100 |
| Mandrel Bend (cm.) | 0.3 | 0.3 | 0.3 | 0.3 | 0.3 | 0.3 |

|  | Coating System (Sn) | | | | | |
| --- | --- | --- | --- | --- | --- | --- |
|  | J-control | J | K-control | K | L-control | L |
| Appearance | clear | clear | clear | clear | clear | clear |
| Persoz (sec.) | 297 | 341 | 363 | 386 | 322 | 364 |
| Direct Impact (cm.kg.) | >184 | >184 | >184 | >184 | >184 | >184 |
| Reverse Impact (cm.kg.) | >184 | >184 | >184 | >184 | >184 | >184 |
| Pencil Hardness | 5H | 8H | 5H | 3H | 6H | 5H |
| Adhesion (%) | 75 | 100 | 100 | 100 | 100 | 100 |
| Mandrel Bend (cm.) | 0.3 | 0.3 | 0.3 | 0.3 | 0.3 | 0.3 |

|  | Coating System (Al) | | | | | |
| --- | --- | --- | --- | --- | --- | --- |
|  | M-control | M | N-control | N | O-control | O |
| Appearance | clear | clear | clear | clear | clear | clear |
| Persoz (sec.) | 387 | 374 | 359 | 387 | 409 | 375 |
| Direct Impact (cm.kg.) | >184 | 80 | >184 | >184 | >184 | >184 |
| Reverse Impact (cm.kg.) | >184 | 46 | >184 | >184 | >184 | >184 |
| Pencil Hardness | 5H | 4H | 5H | 7H | 6H | 5H |
| Adhesion (%) | 85 | 25 | 100 | 100 | 100 | 100 |
| Mandrel Bend (cm.) | 0.3 | <1.8 | 0.3 | 0.3 | 0.3 | 0.3 |

|  | Coating System (Sn) | | | | | |
| --- | --- | --- | --- | --- | --- | --- |
|  | M-control | M | N-control | N | O-control | O |
| Appearance | clear | clear | clear | clear | clear | clear |
| Persoz (sec.) | 300 | 310 | 327 | 296 | 316 | 327 |
| Direct Impact (cm.kg.) | >184 | >184 | >184 | >184 | >184 | >184 |
| Reverse Impact (cm.kg.) | >184 | >184 | >184 | >184 | >184 | >184 |
| Pencil Hardness | 5H | 5H | 4H | 5H | 4H | 6H |
| Adhesion (%) | 15 | 60 | 100 | 100 | 100 | 100 |
| Mandrel Bend (cm.) | 0.3 | 0.3 | 0.3 | 0.3 | 0.3 | 0.3 |

|  | Coating System (Al) | | | | | |
| --- | --- | --- | --- | --- | --- | --- |
|  | P-control | P | Q-control | Q | R-control | R |
| Appearance | clear | clear | clear | clear | clear | clear |
| Persoz (sec.) | 403 | 409 | 410 | 432 | 400 | 415 |
| Direct Impact (cm.kg.) | >184 | >184 | >184 | >184 | >184 | >184 |
| Reverse Impact (cm.kg.) | >184 | >184 | >184 | >184 | >184 | >184 |
| Pencil Hardness | 8H | 6H | 5H | 8H | 5H | 6H |
| Adhesion (%) | 50 | 100 | 100 | 100 | 100 | 100 |
| Mandrel Bend (cm.) | 0.3 | 0.3 | 0.3 | 0.3 | 0.3 | 0.3 |

|  | Coating System (Sn) | | | | | |
| --- | --- | --- | --- | --- | --- | --- |
|  | P-control | P | Q-control | Q | R-control | R |
| Appearance | clear | clear | clear | clear | clear | clear |
| Persoz (sec.) | 277 | 282 | 318 | 328 | 292 | 342 |
| Direct Impact (cm.kg.) | >184 | >184 | >184 | >184 | >184 | >184 |
| Reverse Impact (cm.kg.) | 138 | >184 | >184 | >184 | >184 | >184 |
| Pencil Hardness | H | 5H | 4H | 4H | 5H | 5H |
| Adhesion (%) | 10 | 100 | 25 | 100 | 70 | 100 |
| Mandrel Bend (cm.) | 0.6 | 0.3 | 0.3 | 0.3 | 0.3 | 0.3 |

EXAMPLE III

The flexibility of film coatings based on Resins C and D (Example I) and corresponding controls based on the diglycidylated ether of bisphenol A is determined by formulating the resins with the indicated crosslinking resin and catalyst at a % non-volatile content adjusted to achieve an 18–22 second viscosity rating in a #4 Zahn cup, applying the coating over aluminum with a #14 dry film, curing the coated aluminum for 20 minutes at a cure temperature of 140°–180° C., cutting the panels into 5 cm×10 cm sections and subjecting the reaction to the "T Bend Test" (ASTM 6.01 D4145-1985). Flexibility is expressed as 0T to 7T with 0T being the highest degree of flexibility combined with the absence of visible cracking when viewed under a microscope.

Additional Crosslinking Resins
4-Cymel 300
5-Cymel 370     (see crosslinking resin 1)
6-Cymel 255-10
7-Resimene 741
8-Resimene 747   melamine-formaldehyde resins
9-Resimene 797   from Monsanto Chemical Co.
Additional Catalyst -continued

| Cross-linker | Catalyst | Epoxy: Cross-linker Wt. Ratio | Cat. Conc. (% by wt.) | Flexibility | | | |
|---|---|---|---|---|---|---|---|
| | | | | C | C (Control) | D | D (Control) |
| 4 | 5 | 90:10 | 3 | 3T | 2T-3T | — | — |
| 4 | 3 | 90:10 | 1 | — | — | 0T | >5T |
| 1 | 5 | 90:10 | 3 | 1T-2T | >5T | — | — |
| 1 | 3 | 90:10 | 1 | — | — | >5T | 5T |
| 5 | 5 | 90:10 | 3 | 0T | 5T | — | — |
| 5 | 3 | 90:10 | 1 | — | — | >5T | >5T |
| 6 | 5 | 90:10 | 3 | 1T | 4T | — | — |
| 6 | 3 | 90:10 | 1 | — | — | 2T | 4T |
| 3 | 4 | 75:25 | 1 | 0T | 3T | 0T | * |
| 7 | 5 | 90:10 | 3 | 5T | >5T | — | — |
| 7 | 3 | 90:10 | 1 | — | — | 0T | 4T-5T |
| 8 | 5 | 90:10 | 3 | 0T | >5T | — | — |
| 8 | 3 | 90:10 | 1 | — | — | 0T | >5T |
| 9 | 5 | 90:10 | 3 | 1T | >5T | — | — |
| 9 | 3 | 90:10 | 1 | — | — | 0T | 3T-4T |
| 2 | 2 | 85:15 | 3 | 0T | 2T | — | — |
| 2 | 3 | 85:15 | 1 | — | — | 0T | 4T |

5-Cycat 4040    p-toluenesulfonic acid from American Cyanamid Co.

*Test panel could not be evaluated

These data thus indicate the generally excellent mechanical properties, particularly adhesion and flexibility, for the adducts of this invention.

Summarizing, it is seen that this invention provides co-advanced epoxy systems which afford cured compositions exhibiting improved performance characteristics. Variations may be made in proportions, procedures and materials without departing from the scope of the invention as defined by the following claims.

What is claimed is:

1. An advanced epoxy resin resulting from the reaction of (1) a diglycidyl ether of a di-secondary alcohol corresponding to the formula

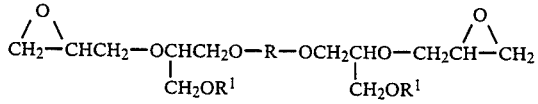

wherein R is phenylene, naphthylene or a radical consisting of two or three phenylene groups linked by one or two carbon-carbon bonds, ether oxygen atoms, sulphur atoms, sulphonyl groups, sulphoxide groups, carbonyl groups, or alkylene groups of 1 to 5 carbon atoms, or each phenylene group or each naphthylene group being substituted in the ring or rings by one or two alkyl groups, each of from 1 to 4 carbon atoms, or by one or two chlorine or bromine atoms; and $R^1$ independently are a straight chain or branched alkyl group of 1 to 16 carbon atoms, or a straight chain or branched alkyl group of 1 to 16 carbon atoms substituted by one to four chlorine or bromine atoms; a straight chain or branched alkenyl group of 2 to 6 carbon atoms, or a straight chain or branched alkenyl group of 2 to 6 carbon atoms substituted by one to four chlorine or bromine atoms; a phenyl or naphthyl group, or a phenyl or naphthyl group substituted in the ring or rings by one or two chlorine or bromine atoms or by one or two alkyl groups, each of 1 to 4 carbon atoms, and having in all from 6 to 12 carbon atoms; a phenylalkyl or naphthylalkyl group or a phenylalkyl or napthylalkyl group substituted in the ring or rings by one or two chlorine or bromine atoms or by one or two alkyl groups, each of 1 to 4 carbon atoms, said phenylalkyl or naphthylalkyl group having in all from 7 to 12 carbon atoms; a cycloalkyl group of 3 to 6 carbon atoms; or a cycloalkylalkyl group of from 4 to 10 carbon atoms; (2) a polyglycidyl ether of a polyhydric phenol other than the diglycidyl ether of component 1; and (3) a dihydric phenol.

2. The resin of claim 1, wherein component 2 is a diglycidyl ether of the formula

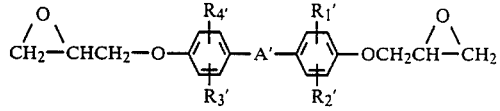

wherein $R_1'$, $R_2'$, $R_3'$ and $R_4'$ are independently hydrogen, chlorine or bromine and A' is $C_1$-$C_4$ alkylene or alkylidene

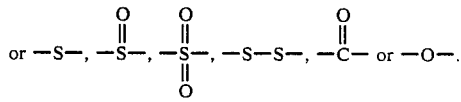

3. The resin of claim 1, wherein $R^1$ are the same and each represents an alkyl group of 1 to 14 carbon atoms, allyl, cyclohexyl or benzyl.

4. The resin of claim 1, wherein R represents a group of formula

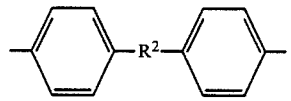

where $R^2$ represents a methylene or isopropylene group, and each $R^1$ represents an alkyl group of from 1 to 12 carbon atoms.

5. The resin of claim 4, wherein component (1) is 2,2-bis(p-3(butoxy-2-glycidyloxypropyloxy)phenyl)-propane.

6. The resin of claim 2, wherein component (2) is the diglycidyl ether of bisphenol A.

7. The resin of claim 1, wherein said dihydric phenol corresponds to the formula

HO—X—OH wherein X is 1,2-phenylene, 1,3-phenylene, 1,4-phenylene or

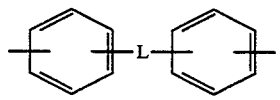

wherein L is a direct bond, alkylene of 1 to 6 carbon atoms, alkylidene of 2 to 6 carbon atoms, or

8. The resin of claim 7, wherein said dihydric phenol is bisphenol A.

9. The resin of claim 1, wherein components (1) and (2) are present in a concentration ranging from 65 to 92%, by weight, and component (3) is present in a concentration of 35 to 8%, by weight.

10. The resin of claim 1, wherein components (1) and (2) are present in a weight ratio of 10:90 to 90:10.

11. The resin of claim 1, wherein component (1) is 2,2-bis(p-3(butoxy-2-glycidyloxypropyloxy)phenyl)-propane, compnent (2) is the diglycidyl ether of bisphenol A and component (3) is bisphenol A.

12. A heat curable composition which comprises the advanced epoxy resin of claim 1 and a curing agent therefor.

13. The heat curable composition of claim 12, wherein said curing agent is a melamine-formaldehyde resin, a urea-formaldehyde resin or a phenol-formaldehyde resin.

14. The cured composition resulting from the elevated temperature curing of the composition of claim 12.

* * * * *